(12) United States Patent
Shlens et al.

(10) Patent No.: US 12,354,340 B2
(45) Date of Patent: Jul. 8, 2025

(54) FULLY ATTENTIONAL COMPUTER VISION

(71) Applicant: Google LLC, Mountain View, CA (US)

(72) Inventors: Jonathon Shlens, San Francisco, CA (US); Ashish Teku Vaswani, San Francisco, CA (US); Niki J. Parmar, Sunnyvale, CA (US); Prajit Ramachandran, Santa Clara, CA (US); Anselm Caelifer Levskaya, Oakland, CA (US); Irwan Bello, San Francisco, CA (US)

(73) Assignee: Google LLC, Mountain View, CA (US)

( * ) Notice: Subject to any disclaimer, the term of this patent is extended or adjusted under 35 U.S.C. 154(b) by 849 days.

(21) Appl. No.: 17/606,976

(22) PCT Filed: May 22, 2020

(86) PCT No.: PCT/US2020/034324
§ 371 (c)(1),
(2) Date: Oct. 27, 2021

(87) PCT Pub. No.: WO2020/237188
PCT Pub. Date: Nov. 26, 2020

(65) Prior Publication Data
US 2022/0215654 A1 Jul. 7, 2022

Related U.S. Application Data (60) Provisional application No. 62/852,277, filed on May 23, 2019.

(51) Int. Cl.
*G06V 10/82* (2022.01)
*G06N 3/04* (2023.01)
*G06T 9/00* (2006.01)

(52) U.S. Cl.
CPC ............... *G06V 10/82* (2022.01); *G06N 3/04* (2013.01); *G06T 9/002* (2013.01)

(58) Field of Classification Search
CPC .......... G06V 10/82; G06N 3/04; G06N 3/045; G06N 3/048; G06N 3/08; G06T 9/002
See application file for complete search history.

(56) References Cited

U.S. PATENT DOCUMENTS

| 10,373,312 | B2 * | 8/2019 | Abedini | ................ G06T 7/0012 |
| 2018/0130203 | A1 * | 5/2018 | Abedini | ................ G06T 7/0012 |

(Continued)

FOREIGN PATENT DOCUMENTS

| CN | 108154145 | 6/2018 |
| CN | 108269275 | 7/2018 |

(Continued)

OTHER PUBLICATIONS

Office Action in Chinese Appln. No. 202080036121.5, dated Feb. 21, 2024, 18 pages (with English translation).

(Continued)

*Primary Examiner* — Pinalben Patel
(74) *Attorney, Agent, or Firm* — Fish & Richardson P.C.

(57) ABSTRACT

A system implemented as computer programs on one or more computers in one or more locations that implements a computer vision model is described. The computer vision model includes a positional local self-attention layer that is configured to receive an input feature map and to generate an output feature map. For each input element in the input feature map, the positional local self-attention layer generates a respective output element for the output feature map by generating a memory block including neighboring input elements around the input element, generates a query vector using the input element and a query weight matrix, for each neighboring element in the memory block, performs posi- (Continued)

tional local self-attention operations to generate a temporary output element, and generates the respective output element by summing temporary output elements of the neighboring elements in the memory block.

17 Claims, 5 Drawing Sheets

(56) References Cited

U.S. PATENT DOCUMENTS

| | | | |
|---|---|---|---|
| 2018/0341860 | A1 | 11/2018 | Shazeer et al. |
| 2019/0034761 | A1 | 1/2019 | Huang et al. |
| 2019/0130213 | A1 | 5/2019 | Shazeer et al. |
| 2021/0117774 | A1* | 4/2021 | Choi ............... G06N 3/045 |
| 2024/0119721 | A1* | 4/2024 | Kc ............... G06V 10/806 |

FOREIGN PATENT DOCUMENTS

| | | |
|---|---|---|
| CN | 108492273 | 9/2018 |
| CN | 108897823 | 11/2018 |
| CN | 109543714 | 3/2019 |
| WO | WO 2019053842 A1 | 3/2019 |

OTHER PUBLICATIONS

Bahdanau et al., "Neural Machine Translation by Jointly Learning to Align and Translate," arXiv, May 19, 2016, 15 pages.
Bartunov et al., "Assessing the Scalability of Biologically-Motivated Deep Learning Algorithms and Architectures," Advances in Neural Information Processing Systems, Dec. 2018, 11 pages.
Bello et al, "Attention Augmented Convolutional Networks," Proceedings of the IEEE/CVF International Conference on Computer Vision, Oct. 2019, pp. 3286-3295.
Buades et al., "A non-local algorithm for image denoising," IEEE Computer Society Conference on Computer Vision and Pattern Recognition, Jul. 25, 2005, 6 pages.
Chan et al., "Listen, attend and spell: A neural network for large vocabulary conversational speech recognition," IEEE International Conference on Acoustics, Speech and Signal Processing, May 19, 2016, pp. 4960-4964.
Chen et al., "A^2-Nets: Double Attention Networks," Advances in Neural Information Processing Systems, Dec. 2018, 10 pages.
Chen et al., "DeepLab: Semantic Image Segmentation with Deep Convolutional Nets, Atrous Convolution, and Fully Connected CRFs," IEEE Transactions on Pattern Analysis and Machine Intelligence , Apr. 27, 2017, 40(4):834-848.
Chen et al., "MaskLab: Instance Segmentation by Refining Object Detection With Semantic and Direction Features," Proceedings of the IEEE Conference on Computer Vision and Pattern Recognition, Jun. 2018, pp. 4013-4022.
Chen et al., "Searching for Efficient Multi-Scale Architectures for Dense Image Prediction," Advances in Neural Information Processing Systems, Dec. 2018, 12 pages.
Chollet, "Xception: Deep learning with depthwise separable convolutions," in Proceedings of the IEEE Conference on Computer Vision and Pattern Recognition, Jul. 2017, pp. 1251-1258.
Chorowski et al., "Attention-based models for speech recognition," Advances in neural information processing systems, 2015, pp. 577-585.
Cohen et al., "Gauge equivariant convolutional networks and the icosahedral cnn," Proceedings of the 36th International Conference on Machine Learning, 2019, 10 pages.
Cohen et al., "Spherical cnns," arXiv, Feb. 25, 2018, 15 pages.
Deng et al., "Imagenet: A large-scale hierarchical image database," IEEE Conference on Computer Vision and Pattern Recognition, Jun. 2009, 8 pages.
DeTone et al., "Superpoint: Self-supervised interest point detection and description," Proceedings of the IEEE Conference on Computer Vision and Pattern Recognition Workshops, Jun. 2018, pp. 224-236.

Devlin et al., "BERT: pre-training of deep bidirectional transformers for language understanding," arXiv, May 24, 2018, 16 pages.
Fukushima, "Neocognitron: A hierarchical neural network capable of visual pattern recognition," Neural networks, 1988, 1(2):119-130.
Fukushima, "Neocognitron: A self-organizing neural network model for a mechanism of pattern recognition unaffected by shift in position," Biological cybernetics, 1980, 36(4):193-202.
Gehring et al., "Convolutional sequence to sequence learning," Proceedings of the 34th International Conference on Machine Learning, 2017, 10 pages.
Ghiasi et al., "Nas-fpn: Learning scalable feature pyramid architecture for object detection," Proceedings of the IEEE/CVF Conference on Computer Vision and Pattern Recognition, 2019, 10 pages.
Gkioxari et al., "Mask r-cnn," Proceedings of the IEEE international conference on computer vision, 2017, pp. 2961-2969.
He et al, "Deep residual learning for image recognition," IEEE, 2016, 9 pages.
He et al., "Identity mappings in deep residual networks," European Conference on Computer Vision, 2016, 16 pages.
Howard et al., "Mobilenets: Efficient convolutional neural networks for mobile vision applications," arXiv, 2017, 9 pages.
Hu et al, "Local relation networks for image recognition," arXiv, 2019, 10 pages.
Hu et al., "Squeeze-and-excitation networks," Proceedings of the IEEE Conference on Computer Vision and Pattern Recognition, Jun. 2018, 10 pages.
Huang et al., "Music transformer," Advances in Neural Processing Systems, Dec. 12, 2018, 14 pages.
International Preliminary Report on Patentability in International Application No. PCT/US2020/034324, dated Dec. 2, 2021, 12 pages.
International Search Report and Written Opinion in International Application No. PCT/US2020/034324, dated Sep. 4, 2020, 18 pages.
Ioffe et al., "Batch normalization: Accelerating deep network training by reducing internal covariate shift," International Conference on Learning Representations, 2015, 9 pages.
Jouppi et al., "In-datacenter performance analysis of a tensor processing unit," SIGARCH Comput. Archit. News, Jun. 2017, 12 pages.
Krizhevsky et al., "Imagenet classification with deep convolutional neural networks," Advances in Neural Information Processing System, 2012, 9 pages.
Krizhevsky, "Learning multiple layers of features from tiny images," 2009, 60 pages.
LeCun et al., "Backpropagation applied to handwritten zip code recognition," Neural computation, 1989, 1(4):541-551.
LeCun et al., "Deep learning," nature, 2015, 521(7553):436.
LeCun et al., "Gradient-based learning applied to document recognition," Proceedings of the IEEE, 1998, 47 pages.
Lin et al., "Microsoft coco: Common objects in context," in European Conference on Computer Vision, 2014, 16 pages.
Lin et al., "Feature pyramid networks for object detection," Proceedings of the IEEE Conference on Computer Vision and Pattern Recognition, 2017, 9 pages.
Lin et al., "Focal loss for dense object detection," Proceedings of the IEEE international conference on computer vision, 2017, 9 pages.
Loshchilov et al., "SGDR: Stochastic gradient descent with warm restarts," arXiv, 2016, 16 pages.
Newell et al., "Stacked hourglass networks for human pose estimation," European Conference on Computer Vision, 2016, pp. 483-499.
Nickolls et al., "The gpu computing era," IEEE micro, 2010, 14 pages.
Office Action in Indian Appln No. 202127048686, dated Mar. 14, 2022, 5 pages (with English translation).
Office Action in Japanese Appln. No. 2021-569519, dated Mar. 13, 2023, 19 pages (with English Translation).
Oord et al., "Wavenet: A generative model for raw audio," arXiv, Sep. 19, 2016, 15 pages.

(56) References Cited

OTHER PUBLICATIONS

Parmar et al., "Image transformer," International Conference on Machine Learning, 2018, 10 pages.
Polyak et al., "Acceleration of stochastic approximation by averaging," SIAM Journal on Control and Optimization, 1992, 18 pages.
Radford et al., "Language models are unsupervised multitask learners," OpenAI, 2019, 24 pages.
Ramachandran et al, "Stand-alone self-attention in vison models" arXiv, Jun. 13, 2019, 15 pages.
Ren et al., "Faster R-CNN: Towards real-time object detection with region proposal networks," Advances in Neural Information Processing Systems, 2015, 9 pages.
Ruderman et al., "Statistics of natural images: Scaling in the woods," Advances in neural information processing systems, Aug. 8, 1994, 5 pages.
Russakovsky et al., "Imagenet large scale visual recognition challenge," CoRR, 2014, 42 pages.
Salimans et al., "PixelCNN++: Improving the PixelCNN with discretized logistic mixture likelihood and other modifications," arXiv, Jan. 19, 2017, 10 pages.
Sandler et al., "Mobilenetv2: Inverted residuals and linear bottlenecks," Proceedings of the IEEE Conference on Computer Vision and Pattern Recognition, Jun. 2018, 11 pages.
Shaw et al., "Self-attention with relative position representations," aXiv, Apr. 12, 2018, 5 pages.
Shazeer et al., "Mesh-tensorflow: Deep learning for supercomputers," CoRR, 2018, 10 pages.
Sifre et al., "Rigid-motion scattering for image classification," PhD thesis, Ph. D. thesis, Oct. 6, 2014, 128 pages.
Simoncelli et al., "Natural Image Statistics and Neural Representation," Annual review of neuroscience, 2001, 24(1):1193-1216.
Sutskever et al., "On the importance of initialization and momentum in deep learning," International Conference on Machine Learning, 2013, 9 pages.
Szegedy et al., "Going Deeper With Convolutions," Proceedings of the IEEE Conference on Computer Vision and Pattern Recognition, Jun. 2015, 9 pages.
Szegedy et al., "Rethinking the Inception architecture for computer vision," IEEE Conference on Computer Vision and Pattern Recognition, Jun. 2016, 9 pages.
Tan et al., "Mnasnet: Platform-aware neural architecture search for mobile," arXiv, May 29, 2018, 9 pages.
Toshev et al., "Deeppose: Human pose estimation via deep neural networks," Proceedings of the IEEE conference on computer vision and pattern recognition, 2014, pp. 1653-1660.
Vaswani et al., "Attention is all you need," Advances in Neural Information Processing Systems, 2017, 11 pages.
Wang et al, "Non-local neural networks" Proceedings of the IEEE Conference on Computer Vision and Pattern Recognition (CVPR), Jun. 2018, 10 pages.
Wu et al., "Google's neural machine translation system: Bridging the gap between human and machine translation," arXiv, Oct. 8, 2016, 23 pages.
Wu et al., "Pay less attention with lightweight and dynamic convolutions," arXiv, Feb. 22, 2019, 14 pages.
Xie et al., "Aggregated residual transformations for deep neural networks," Proceedings of the IEEE Conference on Computer Vision and Pattern Recognition, 2017, 9 pages.
Xu et al., "Show, attend and tell: Neural image caption generation with visual attention," International conference on machine learning, 2015, 10 pages.
Zhu et al., "An empirical study of spatial attention mechanisms in deep networks," Proceedings of the IEEE/CVF International Conference on Computer Vision, 2019, 10 pages.
Zoph et al., "Learning transferable architectures for scalable image recognition," Proceedings of the IEEE conference on computer vision and pattern recognition, 2018, pp. 8697-8710.
Zoph et al., "Neural architecture search with reinforcement learning," in International Conference on Learning Representations, 2017, 16 pages.
Office Action in European Appln. No. 20732399.9, mailed on Apr. 11, 2024, 11 pages.
Office Action in European Appln. No. 20732399.9, mailed on Aug. 21, 2024, 15 pages.

\* cited by examiner

FIG. 1

FIG. 2 An example of a memory block around $i = 3, j = 3$ (one-extended) with spatial extent $k = 3$

FIG. 3

| -1, -1 | -1, 0 | -1, 1 | -1, 2 |
|--------|-------|-------|-------|
| 0, -1  | 0, 0  | 0, 1  | 0, 2  |
| 1, -1  | 1, 0  | 1, 1  | 1, 2  |
| 2, -1  | 2, 0  | 2, 1  | 2, 2  |

An example of relative distance computation. The relative distances are computed with respect to the position of the highlighted input element. The format of distances is *row offset, column offset.*

FULLY ATTENTIONAL COMPUTER VISION

CROSS REFERENCE TO RELATED APPLICATIONS

This application is a National Stage Application under 35 U.S.C. § 371 of International Application No. PCT/US2020/034324, filed May 22, 2020, which is a non-provisional of and claims priority to U.S. Provisional Patent Application No. 62/852,277, filed on May 23, 2019, the entire contents of which are hereby incorporated by reference.

BACKGROUND

This specification relates to a neural network system for implementing a computer vision neural network model.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Examples of neural networks include convolutional neural networks. Convolutional neural networks generally include at least two kinds of neural network layers, convolutional neural network layers and fully-connected neural network layers. Convolutional neural network layers have sparse connectivity, with each node in a convolutional layer receiving input from only a subset of the nodes in the next lowest neural network layer. Some convolutional neural network layers have nodes that share weights with other nodes in the layer. Nodes in fully-connected layers, however, receive input from each node in the next lowest neural network layer.

SUMMARY

This specification describes a neural network system implemented as computer programs on one or more computers in one or more locations that implements a computer vision neural network.

The subject matter described in this specification can be implemented in particular embodiments so as to realize one or more of the following advantages. Convolutions are a fundamental building block of modern computer vision systems. The techniques described in this specification allow for a replacement of one or more convolutional layers in neural networks with a new building block based on self-attention, i.e., a positional local self-attention neural network layer. The resulting neural network can outperform conventional convolutional neural networks while requiring fewer parameters in computer vision tasks such as image classification and object detection. In particular, the positional local self-attention neural network layer uses a memory block that includes neighboring input elements around a given input element of an input feature map to perform local attention. Thus, the resulting neural network is more computationally efficient than prior models that use global attention between all input elements. This is because global attention can only be used after significant spatial down-sampling has been applied to the input due to its expensive computational cost, which prevents its usage across all neural network layers in a fully attentional model. Further, the positional local self-attention neural network layer encodes positional information of the input elements in attention, thus improving expressivity and resulting in outputs that have significantly better accuracies than those generated by neural networks that use conventional convolutions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a neural network system implemented as computer programs on one or more computers in one or more locations that implement a computer vision neural network that includes a positional local self-attention neural network layer. The positional local self-attention neural network layer can be used to replace one or more convolutional layers in conventional computer vision neural network models in order to obtain better performance in computer vision tasks such as image classification and object detection while requiring fewer parameters and computational resources.

Generally, the computer vision neural network can be configured to receive input image data and to generate any kind of score or classification output based on the input image, i.e., can be configured to perform any kind of image processing task. The score or classification output generated by the computer vision neural network depends on the task that the computer vision neural network has been configured to confirm. For example, for an image classification or recognition task, the output generated by the computer vision neural network for a given image may be scores for each of a set of object categories, with each score representing the likelihood that the image contains an image of an object belonging to the category. As another example, for an object detection task, the output generated by the computer vision neural network can identify a location, a size, or both, of an object of interest in the input image.

Figure 1:
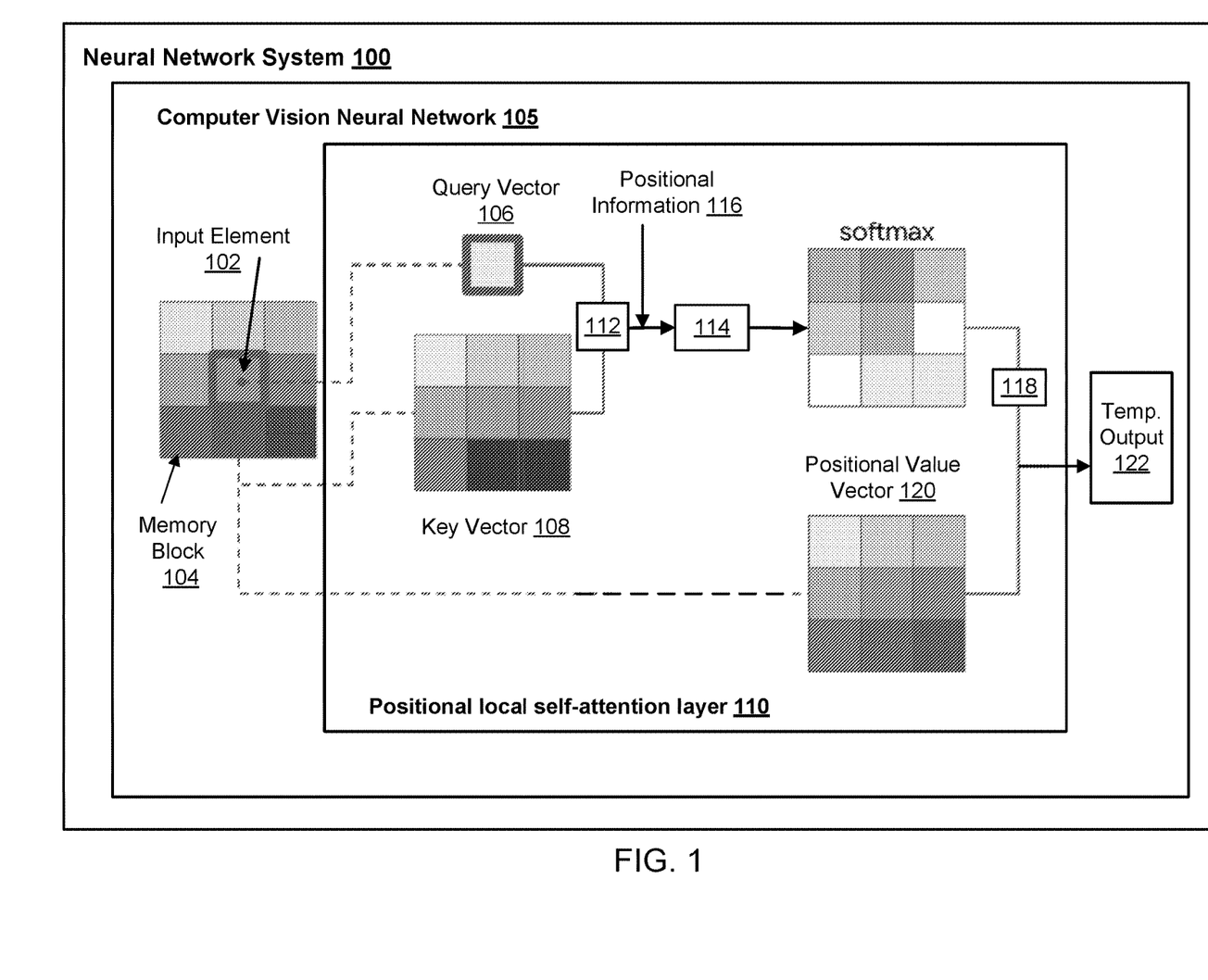
FIG. 1 shows an example neural network system that implements a computer vision neural network that has a positional local self-attention layer.

FIG. 1 illustrate an example neural network system. The neural network system 100 is an example of a system implemented as computer programs on one or more computers in one or more locations, in which the systems, components, and techniques described below can be implemented. The neural network system 100 implements a computer vision neural network 105 that includes a positional local self-attention layer 110 (also referred to as "the layer 110" for simplicity). Although only a single layer 110 is illustrated, the computer vision neural network 105 can include multiple such layers and/or other types of neural network layers, e.g., 1×1 convolutions, other convolutional layers, and fully-connected layers.

As a particular example described below, the computer vision neural network 105 can be generated from an existing convolutional neural network by replacing all, or a subset, of the spatial convolutional layers in the existing convolutional neural network with a positional local self-attention layer.

The positional local self-attention layer 110 is configured to receive an input feature map (e.g., of an input image) and to generate an output feature map that characterizes features of the input feature map using both local content and positional information of the input feature map. The positional local self-attention layer 110 may receive the input feature map from a previous layer of the computer vision neural network 105, from a user of the system 100 or from another system. The output feature map can be provided as input to the next layer of the computer vision neural network 105 or outputted as an output of the computer vision neural network 105.

For each input element (e.g., input element 102 which is a pixel) in the input feature map, the positional local self-attention layer 110 is configured to generate a respective output element for the output feature map using positional local self-attention. The input feature map can be denoted as $x \in \mathbb{R}^{h \times w \times d_{in}}$ with height h, width w, and input channels $d_{in}$, and the output feature map can be denoted as $y \in \mathbb{R}^{h \times w \times d_{out}}$ with output channels $d_{out}$.

Figure 2:
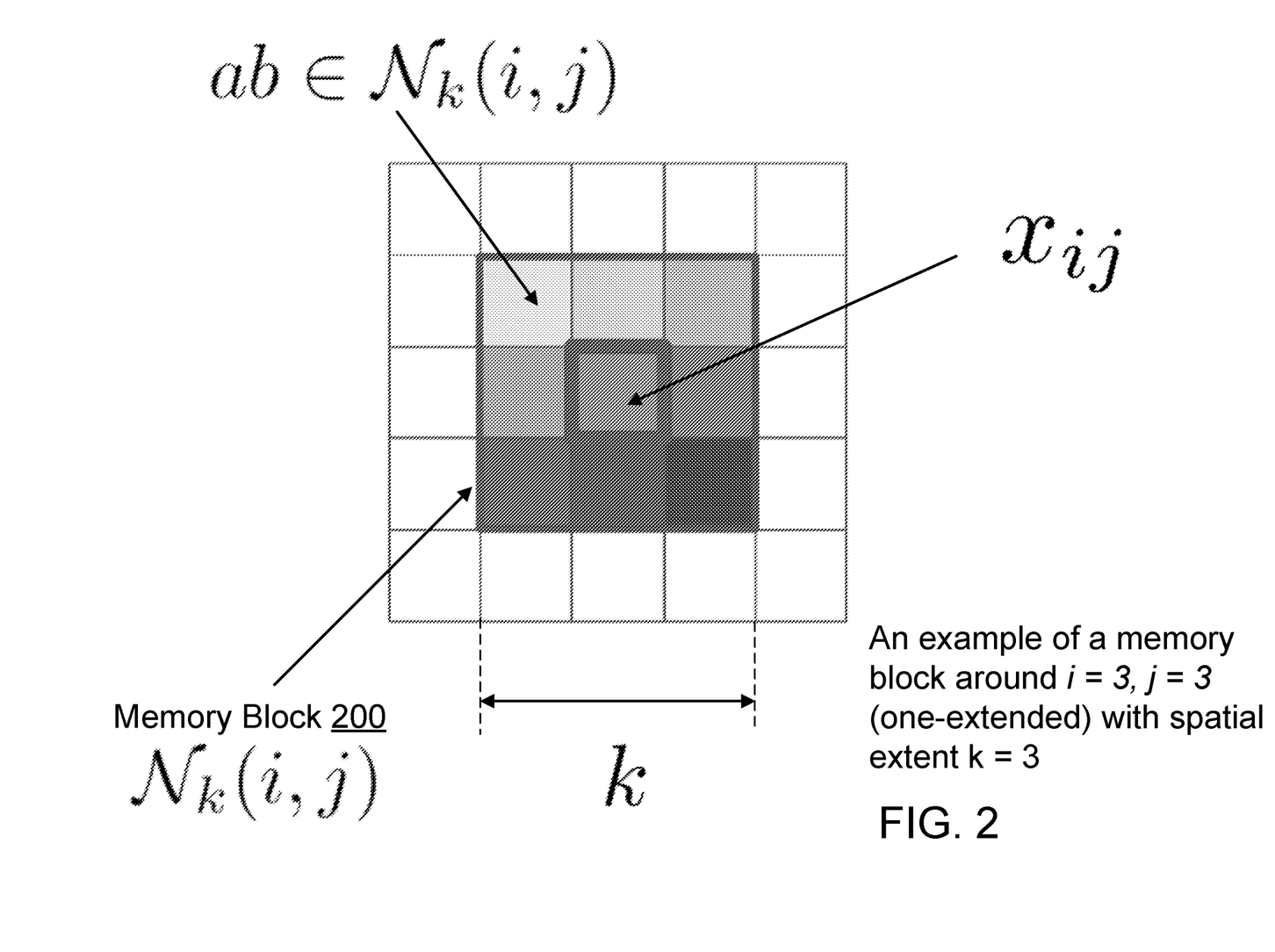
FIG. 2 illustrates an example of a memory block.

To generate an output element $y_{ij}$ for an input element $x_{ij}$, the layer 110 first generates a memory block that includes neighboring input elements around the input element. In particular, given the input feature map $x \in \mathbb{R}^{h \times w \times d_{in}}$, the layer 110 extracts a local neighborhood $\mathcal{N}_k(i,j)$ around an input element (which is a vector $x_{ij} \in \mathbb{R}^{d_{in}}$) of the input feature map with spatial extent k centered around the input element $x_{ij}$, resulting in a region with shape $k \times k \times d_{in}$ (gray region as shown in FIG. 2). This region is called a memory block (e.g., memory block 104 of FIG. 1). The memory block includes neighboring input elements (i.e., neighboring pixels around pixel 102) in position $ab \in \mathcal{N}_k(i,j)$, where a and b are coordinates relative to (i,j). An example of a memory block around $x_{ij}$ is illustrated by FIG. 2. In the example shown, k=3, though other values of k may alternatively be used. For example, k may lie in the range [2, 20], such as in the range [6, 11], e.g. k=7.

The layer 110 applies a learned query linear transformation to the input element $x_{ij}$ to generate a query vector $q_{ij}$ (e.g., query vector 106), for example, as shown in the following equation:

$$q_{ij} = W_Q x_{ij},$$

where $W_Q \in \mathbb{R}^{d_{out} \times d_{in}}$ is a learned query weight matrix.

For each of the neighboring elements $x_{ab}$ around the input element $x_{ij}$ in the memory block, the layer 110 applies a learned key linear transformation to the neighboring element to generate a respective key vector (e.g., key vector 108). For example, the layer 110 generates a respective key vector as follows:

$$k_{ab} = W_K x_{ab},$$

where $k_{ab}$ denotes the respective key vector, $W_K \in \mathbb{R}^{d_{out} \times d_{in}}$ is a learned key weight matrix.

For each of the neighboring elements $x_{ab}$ around the input element $x_{ij}$ in the memory block, the layer 110 generates a positional value vector from the neighboring element and one or more positional value weight matrices. The one or more positional value weight matrices represent spatial distance between the input element to each of its neighboring input elements in the memory block. For example, the positional value vector, denoted as $v_{ab}$, can be computed as follows:

$$v_{ab} = (\Sigma_m p(a,b,m) W_V^m) x_{ab},$$

where m is a fixed integer greater than or equal to one and represents a number of mixture components used to generate the value vector, the one or more positional value weight matrices $W_V^m \in \mathbb{R}^{d_{out} \times d_{in}}$, i.e., a respective weight matrix for each mixture component m, are combined through a convex combination of positional coefficients p(a,b,m) for each mixture component m that are a function of the position of the neighboring element in its neighborhood. An example of such function is defined in the following equation which computes the logit between the absolute embedding for the coordinates (a,b) and the mixture embedding $v^m$ for the mixture component m.

$$p(a,b,m) = \text{softmax}_m((emb_{row}(a) + emb_{col}(b))^T v^m),$$

where $emb_{row}(a)$ and $emb_{col}(b)$ are pooling-window aligned row and column embeddings and $v^m$ is a per-mixture embedding. If the layer 110 uses multiple attention heads, the resulting p(a,b,m) are shared across all attention heads of the layer 110.

The query weight matrix $W_Q$, the key weight matrix $W_K$, and one or more positional value weight matrices $W_V^m$ can be obtained by training the computer vision neural network 105.

The layer 110 generates a query-key product 112 by taking a product of the query vector and the key vector, such as a dot product of the query vector and the key vector:

$$\text{Query-key product} = q_{ij}^T k_{ab}$$

Figure 4:
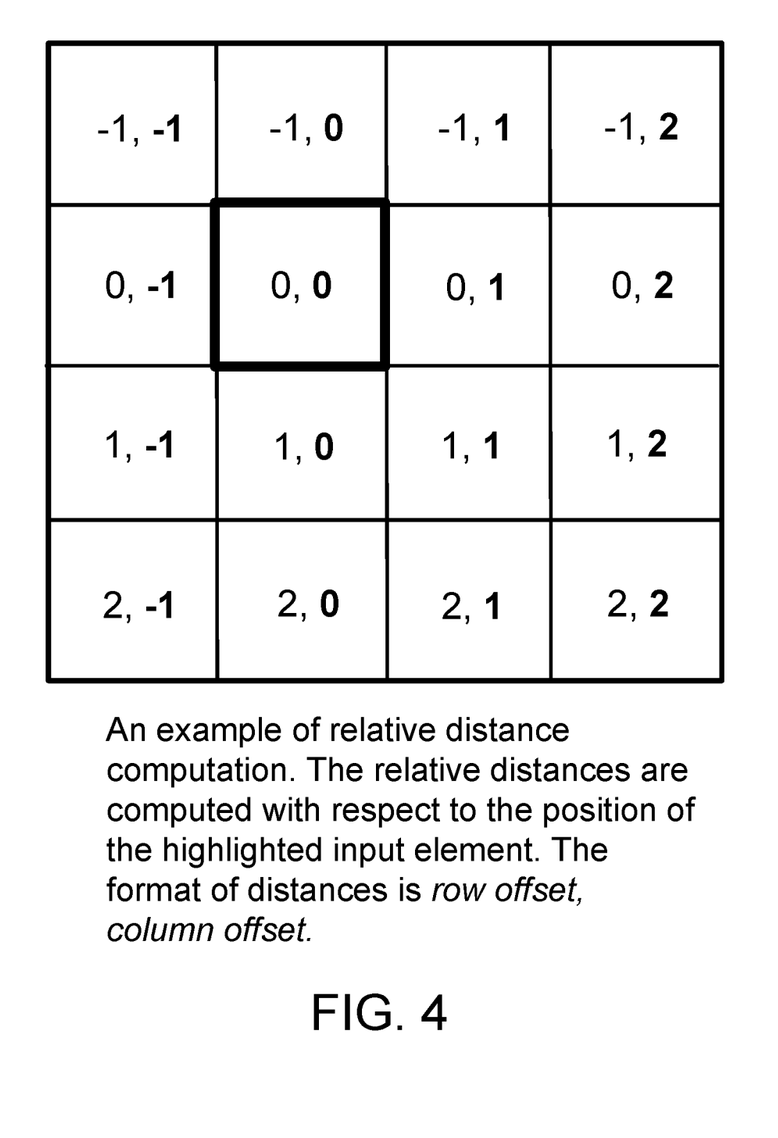
FIG. 4 illustrates an example of relative distance computation.

The layer 110 generates a positional query-key product 114 by adding positional information 116 to the query-key product 112, e.g.:

$$\text{Positional query-key product} = q_{ij}^T k_{ab} + q_{ij}^T r_{a-i,b-j},$$

wherein $q_{ij}^T r_{a-i,b-j}$ is a query-distance product that includes the positional information. The positional information is added to the query-key product to improve expressivity for computer vision tasks. $r_{a-i,b-j}$ is a relative distance vector that represents the relative distance of ij to each position $ab \in \mathcal{N}_k(i,j)$. The relative distance is factorized across dimensions, so each element $ab \in \mathcal{N}_k(i,j)$ receives two distances: a row offset a-i and a column offset b-j. The row and column offsets are associated with an embedding $r_a$-i and an embedding $r_b$-j respectively each with dimension ½ $d_{out}$. The layer 110 concatenates the row and column offset embeddings to form the relative distance $r_{a-i,b-j}$. An example of relative distance computation is shown in FIG. 4.

The layer 110 generates an intermediate output 118 by applying a softmax operation on the positional query-key product 114, e.g.:

$$\text{softmax}_{ab}(q_{ij}^T k_{ab} + q_{ij}^T r_{a-i,b-j})$$

The layer 110 generates a temporary output element 122 for the current neighboring element $x_{ab}$ by computing a product of the intermediate output 118 and the positional value vector 120, e.g.:

$$\text{softmax}_{ab}(q_{ij}^T k_{ab} + q_{ij}^T r_{a-i,b-j}) v_{ab}$$

The layer 110 generates the output element $y_{ij}$ for the input element $x_{ij}$ by summing temporary output elements generated for all neighboring elements in the memory block, e.g.:

$$y_{ij} = \sum_{a,b \in N_k(i,j)} \text{softmax}_{ab}(q_{ij}^T k_{ab} + q_{ij}^T r_{a-i,b-j}) v_{ab} \quad (*)$$

The above process for computing an output element for an input element is called a single-headed positional local self-attention process and is repeatedly performed by the layer 110 for every input element ij in the input feature map.

In some implementations where the layer 110 uses multiple attention heads to learn multiple distinct representations of the input feature map, the layer 110 may partition the input element $x_{ij}$ depthwise into N sub-input elements $x_{ij}^n \in \mathbb{R}^{d_{in}/N}$, compute single-headed positional local self-attention on each sub-input element separately as above with different linear transformations $W_Q^n$, $W_K^n$, $W_V^n \in \mathbb{R}^{d_{out}/N \times d_{in}/N}$ per head in order to generate a respective sub-output element, and then concatenate the sub-output elements into the final output element $y_{ij} \in \mathbb{R}^{d_{out}}$ for input element $x_{ij}$. In some implementations, the sub-output elements for sub-input elements can be generated in parallel.

Because the positional local self-attention layer 110 performs local self-attention on pixels in the memory block 104, the positional local self-attention layer 110 differs from conventional neural network layers exploring attention in vision which have performed global (i.e., all-to-all) attention between all pixels. Global attention can only be used after significant spatial down-sampling has been applied to the input because it is computationally expensive, which prevents its usage across all layers in a fully attentional model.

By performing local self-attention, the layer 110 can be used to replace spatial convolutions and build a fully attentional model that is more computationally efficient than prior models that use spatial convolutions. This is because the parameter count of attention is independent of the size of spatial extent, whereas the parameter count for convolution grows quadratically with spatial extent. The computational cost of attention also grows slower with spatial extent compared to convolution with typical values of $d_{in}$ and $d_{out}$. For example, if $d_{in}=d_{out}=128$, a convolution layer with k=3 has the same computational cost as an attention layer with k=19.

Further, the positional local self-attention neural network layer 110 encodes positional information of the input elements in attention, thus improving expressivity and resulting in outputs that have significantly better accuracies than those generated by neural networks that use only conventional convolutions.

Figure 3:
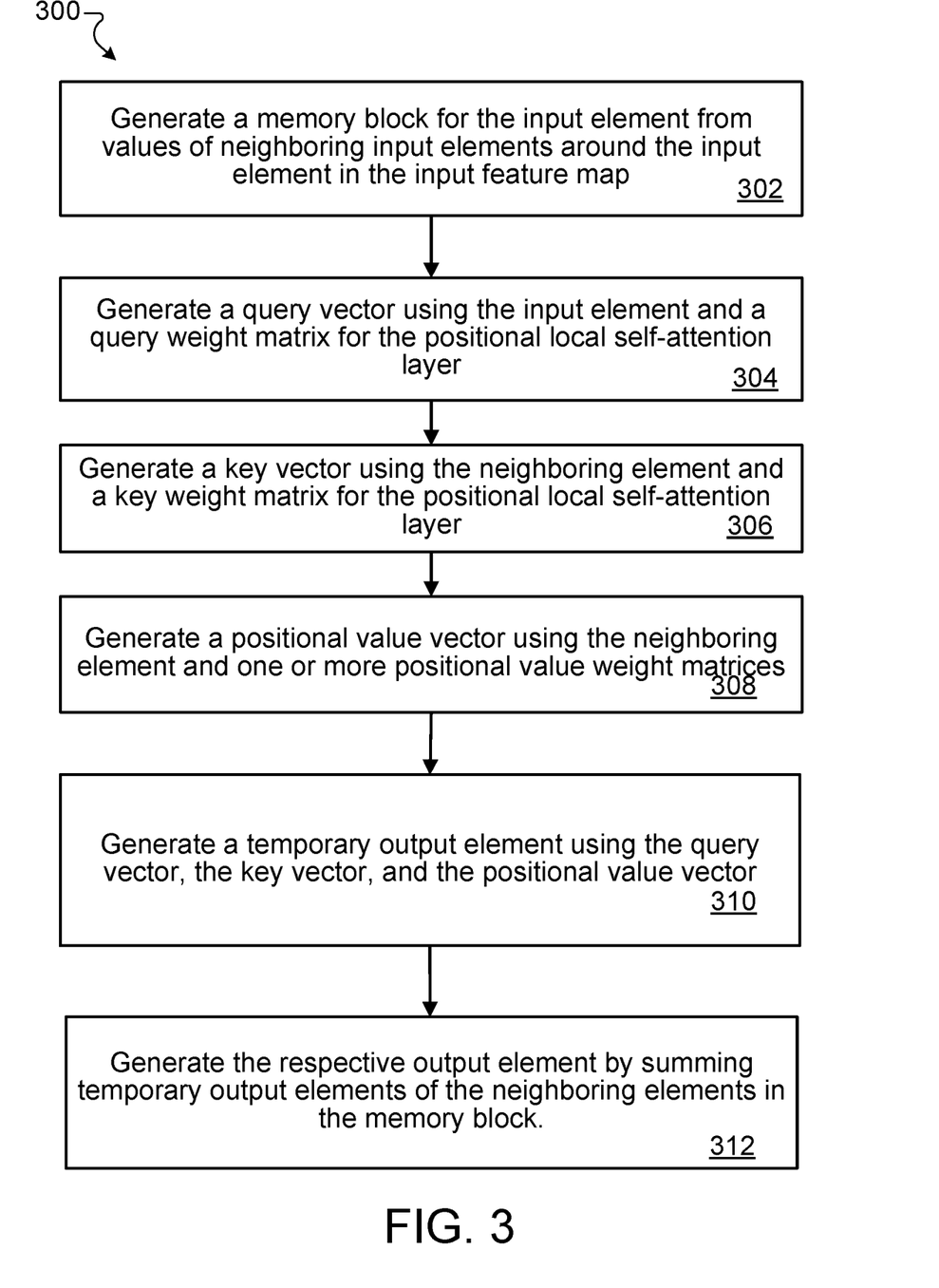
FIG. 3 is a flow diagram of an example process for generating an output element for an input element of an input feature map.

FIG. 3 is a flow diagram of an example process for generating an output element for an input element in an input feature map. For convenience, the process 300 will be described as being performed by a system of one or more computers located in one or more locations. For example, a neural network system, e.g., the network system 100 of FIG. 1, appropriately programmed in accordance with this specification, can perform the process 300.

The system generates a memory block for the input element including neighboring input elements around the input element in the input feature map (step 302). For example, given the input feature map $x \in \mathbb{R}^{h \times w \times d_{in}}$, the system extracts a local neighborhood $N_k(i,j)$ around an input element $x_{ij} \in \mathbb{R}^{d_{in}}$ of the input feature map with spatial extent k centered around the input element $x_{ij}$, resulting in a memory block with shape $k \times k \times d_{in}$. The memory block includes neighboring input elements $x_{ab}$ in position $ab \in N_k(i,j)$.

The system generates a query vector using the input element and a query weight matrix (step 304). For example, the system applies a learned query linear transformation to the input element $x_{ij}$ to generate a query vector $q_{ij}$ as follows:

$$q_{ij} = W_Q x_{ij},$$

where $W_K \in \mathbb{R}^{d_{out} \times d_{in}}$ is a learned query weight matrix.

For each neighboring element $x_{ab}$ in the memory block, the system performs steps 306-310 as follows.

The system generates a respective key vector using the neighboring element and a key weight matrix (step 306). For example, the system applies a learned key linear transformation to the neighboring element to generate the respective key vector as follows:

$$k_{ab} = W_K x_{ab},$$

where $W_K \in \mathbb{R}^{d_{out} \times d_{in}}$ is a learned key weight matrix.

The system generates a positional value vector using the neighboring element and one or more positional value weight matrices (step 308). The one or more positional value weight matrices represent spatial distance between the input element to each of its neighboring input elements in the memory block. For example, the positional value vector, denoted as $v_{ab}$, can be computed as follows:

$$v_{ab} = (\Sigma_m p(a,b,m) W_V^m) x_{ab},$$

where the one or more positional value weight matrices $W_V^m \in \mathbb{R}^{d_{out} \times d_{in}}$ are combined through a convex combination of positional coefficients $p(a,b,m)$ that are a function of the position of the neighboring element in its neighborhood. In other words, the system generates a combined value weight matrix $\Sigma_m p(a,b,m) W_V^m$ as a convex combination of the one or more positional value weight matrices $W_V^m$ using the corresponding one or more positional coefficients $p(a,b,m)$, and then generates the positional value vector using the neighboring element and the combined value weight matrix.

The system generates a temporary output element using the query vector, the key vector, and the positional value vector (step 310).

In particular, the system generates a query-key product by taking a product of the query vector and the key vector, such as a dot product of the query vector and the key vector:

$$\text{Query-key product} = q_{ij}^T k_{ab}$$

The system generates a positional query-key product by adding positional information to the query-key product, e.g.:

$$\text{Positional query-key product} = q_{ij}^T k_{ab} + q_{ij}^T r_{a-i,b-j},$$

wherein $q_{ij}^T r_{a-i,b-j}$ is a query-distance product that includes the positional information. The positional information is added to the query-key product to improve expressivity for computer vision tasks. $r_{a-i,b-j}$ is a relative distance vector that represents the relative distance of ij to each position $ab \in N_k(i,j)$. The relative distance is factorized across dimensions, so each element $ab \in N_k(i,j)$ receives two distances: a row offset a-i and a column offset b-j. The row and column offsets are associated with an embedding $r_a-i$ and an embedding $r_{b-j}$ respectively each with dimension $\frac{1}{2} d_{out}$. The system concatenates the row and column offset embeddings to form the relative distance $r_{a-i,b-j}$.

The system generates an intermediate output by applying a softmax operation on the positional query-key product, e.g.:

$$\text{softmax}_{ab}(q_{ij}^T k_{ab} + q_{ij}^T r_{a-i,b-j})$$

The system generates a temporary output element for the current neighboring element $X_{ab}$ by computing a product of the intermediate output and the positional value vector, e.g.:

$$\text{softmax}_{ab}(q_{ij}^T k_{ab} + q_{ij}^T r_{a-i,b-j}) v_{ab}$$

The system generates the respective output element by summing the temporary output elements generated for the neighboring elements in the memory block (step 312). For example, the system generates the respective output element $y_{ij}$ as follows:

$$y_{ij} = \sum_{a,b \in N_k(i,j)} softmax_{ab}(q_{ij}^T k_{ab} + q_{ij}^T r_{a-i,b-j}) v_{ab}$$

Figure 5:
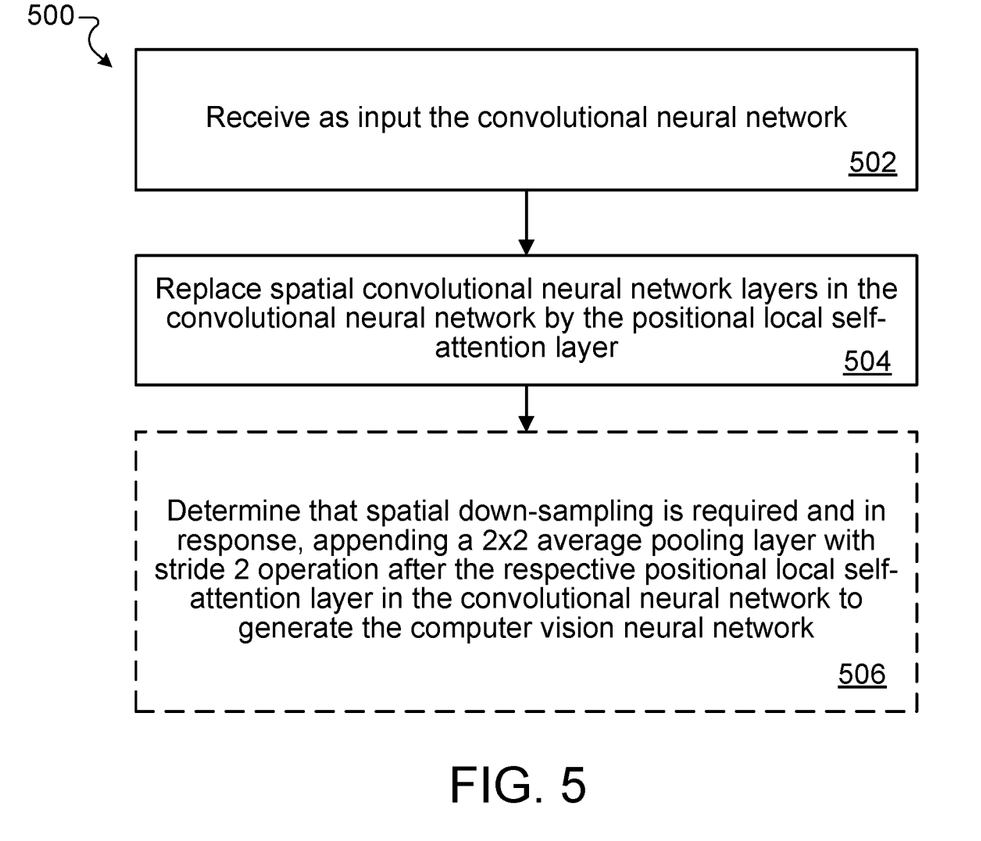
FIG. 5 is a flow diagram of an example process for transforming a convolutional neural network to a computer vision neural network having one or more positional local self-attention layers.

FIG. 5 is a flow diagram of an example process for transforming a convolutional neural network to a computer vision neural network having one or more positional local self-attention layers. For convenience, the process 500 will be described as being performed by a system of one or more computers located in one or more locations. For example, a neural network system, e.g., the network system 100 of FIG. 1, appropriately programmed in accordance with this specification, can perform the process 500.

The system receives as input data specifying a convolutional neural network (step 502).

The system replaces spatial convolutional neural network layers in the convolutional neural network by a positional local self-attention layer (step 504). A spatial convolution is defined as a convolution with spatial extent k>1. This definition excludes 1×1 convolutions, which may be viewed as a standard fully connected layer applied to each pixel independently. The system replaces every instance of a spatial convolution with a positional local self-attention layer as defined in Equation (*).

Optionally, the system determines when spatial down-sampling is required and in response, the system appends a 2×2 average pooling layer with stride 2 operation following the respective positional local self-attention layer (step 506). Spatial down-sampling decreases the spatial size of an input in order to reduce the computational cost and increase the "receptive field," which generally refers to how many pixels in the input image affect a specific output of a neural network layer. The choice of when to spatially down-sample is typically made through a combination of human-designed heuristics and experimental tuning, where one tries out many locations to place down-sampling and chooses the best performing one. In the following example, the system determines when spatial down-sampling is required based on the spatial down-sampling design choices made by the network designer of the received convolutional neural network. Then the system appends a 2×2 average pooling layer with stride 2 operation after the respective positional local self-attention layer whenever spatial down-sampling is required.

For example, the convolutional neural network is a ResNet neural network. Examples of ResNet neural network architectures are described in K. He, X. Zhang, S. Ren, and J. Sun, "Deep residual learning for image recognition," in IEEE Conference on Computer Vision and Pattern Recognition, 2016. The core building block of a ResNet neural network is a bottleneck block with a structure of a 1×1 down-projection convolution, a 3×3 spatial convolution, and a 1×1 up-projection convolution, followed by a residual connection between the input of the block and the output of the last convolution in the block. The bottleneck block is repeated multiple times to form the ResNet, with the output of one bottleneck block being the input of the next bottleneck block. The transform described in steps 502-506 swaps the 3×3 spatial convolution with a positional local self-attention layer as defined in Equation (*). All other structure, including the number of layers and when spatial down-sampling is applied can be preserved.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising one or more computers and one or more storage devices storing instructions that when executed by the one or more computers cause the one or more computers to implement:
a computer vision neural network, the computer vision neural network comprising a positional local self-attention layer configured to receive an input feature map and to generate an output feature map that characterizes features of the input feature map using both local content and positional information of the input feature map, wherein the positional local self-attention layer is configured to:
for each of a plurality of input elements in the input feature map, generate a respective output element for the output feature map, the generating comprising:
determining, for the input element, a plurality of neighboring input elements around the input element of the input feature map,
generating a query vector using the input element and a query weight matrix,
for each neighboring element, performing the following positional local self-attention operations:
generating a key vector using the neighboring element and a key weight matrix,
generating a positional value vector using the neighboring element and one or more positional value weight matrices, wherein the one or more positional value weight matrices represent spatial distance between the input element to each of its neighboring input elements, and
generating a temporary output element using the query vector, the key vector, and the positional value vector, comprising:
generating a query-key product by taking a dot product of the query vector and the key vector,
generating a positional query-key product based on the query-key product,
generating an intermediate output by applying a softmax operation on the positional query-key product, and
generating the temporary output element by computing a product of the intermediate output and the positional value vector, and
generating the respective output element by summing temporary output elements of the neighboring elements.

2. The system of claim 1, wherein the positional local self-attention layer is further configured to maintain, for each neighboring element, a positional coefficient for each of the positional value weight matrices,
and wherein, for each neighboring element, generating the positional value vector using the neighboring element and the one or more positional value weight matrices comprises:
generating a combined value weight matrix as a combination of the one or more positional value weight matrices using the corresponding one or more positional coefficients, and
generating the positional value vector using the neighboring element and the combined value weight matrix.

3. The system of claim 1, wherein the positional local self-attention layer is configured to maintain, for each neighboring element, a relative distance vector having a value as a function of the distance from the neighboring element to the input element,
and wherein generating the positional query-key product by adding positional information to the query-key product comprises:
generating a query-distance product by taking a dot product of the query vector and the relative distance vector, and
generating the positional query-key product by adding the query-distance product to the query-key product.

4. The system of claim 1, wherein an input element of the input feature map is a vector.

5. The system of claim 1, wherein generating the respective output element for each input element in the feature map comprising:
dividing the input element into a plurality of sub-input elements,
for each sub-input element, generating a respective sub-output element using the positional local self-attention operations, and
generating the output element by assembling all sub-output elements.

6. The system of claim 5, wherein sub-output elements for sub-input elements are generated in parallel.

7. The system of claim 1, wherein the query weight matrix, the key weight matrix, and one or more positional value weight matrices are obtained by training the computer vision neural network.

8. A computer implemented method of classifying image data, the method comprising:
receiving, as input to a computer vision neural network, image data;
processing the image data using the computer vision neural network to generate a classification output based on an input image,
wherein the computer vision neural network comprises a positional local self-attention layer configured to receive an input feature map and to generate an output feature map that characterizes features of the input feature map using both local content and positional information of the input feature map, wherein the positional local self-attention layer is configured to:
for each of a plurality of input elements in the input feature map, generate a respective output element for the output feature map, the generating comprising:
determining, for the input element, a plurality of neighboring input elements around the input element of the input feature map,
generating a query vector using the input element and a query weight matrix,
for each neighboring element, performing the following positional local self-attention operations:
generating a key vector using the neighboring element and a key weight matrix,
generating a positional value vector using the neighboring element and one or more positional value weight matrices, wherein the one or more positional value weight matrices represent spatial distance between the input element to each of its neighboring input elements, and generating a temporary output element using the query vector, the key vector, and the positional value vector, comprising:
generating a query-key product by taking a dot product of the query vector and the key vector,
generating a positional query-key product based on the query-key product,
generating an intermediate output by applying a softmax operation on the positional query-key product, and
generating the temporary output element by computing a product of the intermediate output and the positional value vector, and
generating the respective output element by summing temporary output elements of the neighboring elements.

9. The method of claim 8, wherein the positional local self-attention layer is further configured to maintain, for each neighboring element, a positional coefficient for each of the positional value weight matrices,
and wherein, for each neighboring element, generating the positional value vector using the neighboring element and the one or more positional value weight matrices comprises:
generating a combined value weight matrix as a combination of the one or more positional value weight matrices using the corresponding one or more positional coefficients, and
generating the positional value vector using the neighboring element and the combined value weight matrix.

10. The method of claim 8, wherein the positional local self-attention layer is configured to maintain, for each neighboring element, a relative distance vector having a value as a function of the distance from the neighboring element to the input element,
and wherein generating the positional query-key product by adding positional information to the query-key product comprises:
generating a query-distance product by taking a dot product of the query vector and the relative distance vector, and
generating the positional query-key product by adding the query-distance product to the query-key product.

11. The method of claim 8, wherein an input element of the input feature map is a vector.

12. The method of claim 8, wherein generating the respective output element for each input element in the feature map comprising:
dividing the input element into a plurality of sub-input elements,
for each sub-input element, generating a respective sub-output element using the positional local self-attention operations,
generating the output element by assembling all sub-output elements.

13. The method of claim 12, wherein sub-output elements for sub-input elements are generated in parallel.

14. The method of claim 8, wherein the query weight matrix, the key weight matrix, and one or more positional value weight matrices are obtained by training the computer vision neural network.

15. One or more non-transitory computer-readable storage media encoded with instructions that, when executed by one or more computers, cause the one or more computers to perform operations for classifying image data, the operations comprising:
receiving, as input to a computer vision neural network, image data;
processing the image data using the computer vision neural network to generate a classification output based on an input image,
wherein the computer vision neural network comprises a positional local self-attention layer configured to receive an input feature map and to generate an output feature map that characterizes features of the input feature map using both local content and positional information of the input feature map, wherein the positional local self-attention layer is configured to:
for each of a plurality of input elements in the input feature map, generate a respective output element for the output feature map, the generating comprising:
determining, for the input element, a plurality of neighboring input elements around the input element of the input feature map,
generating a query vector using the input element and a query weight matrix,
for each neighboring element, performing the following positional local self-attention operations:
generating a key vector using the neighboring element and a key weight matrix,
generating a positional value vector using the neighboring element and one or more positional value weight matrices, wherein the one or more positional value weight matrices represent spatial distance between the input element to each of its neighboring input elements, and
generating a temporary output element using the query vector, the key vector, and the positional value vector, comprising:
generating a query-key product by taking a dot product of the query vector and the key vector,
generating a positional query-key product based on the query-key product,
generating an intermediate output by applying a softmax operation on the positional query-key product, and
generating the temporary output element by computing a product of the intermediate output and the positional value vector, and
generating the respective output element by summing temporary output elements of the neighboring elements.

16. The one or more non-transitory computer-readable storage media of claim 15, wherein the positional local self-attention layer is further configured to maintain, for each neighboring element, a positional coefficient for each of the positional value weight matrices,
and wherein, for each neighboring element, generating the positional value vector using the neighboring element and the one or more positional value weight matrices comprises:
generating a combined value weight matrix as a combination of the one or more positional value weight matrices using the corresponding one or more positional coefficients, and
generating the positional value vector using the neighboring element and the combined value weight matrix.

17. The one or more non-transitory computer-readable storage media of claim 15, wherein the positional local self-attention layer is configured to maintain, for each neighboring element, a relative distance vector having a value as a function of the distance from the neighboring element to the input element, and wherein generating the positional query-key product by adding positional information to the query-key product comprises:

generating a query-distance product by taking a dot product of the query vector and the relative distance vector, and generating the positional query-key product by adding the query-distance product to the query-key product.

\* \* \* \* \*